US 6,467,018 B1

(12) United States Patent
Dell et al.

(10) Patent No.: US 6,467,018 B1
(45) Date of Patent: Oct. 15, 2002

(54) METHOD AND APPARATUS FOR ADDRESSING INDIVIDUAL BANKS OF DRAMS ON A MEMORY CARD

(75) Inventors: Timothy J. Dell, Colchester; Mark W. Kellogg, Essex Junction, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,536

(22) Filed: Jan. 4, 1999

(51) Int. Cl.[7] .............................................. G06F 12/00
(52) U.S. Cl. .................... 711/105; 711/5; 365/230.04; 365/230.03
(58) Field of Search ................ 711/105, 5; 365/230.03, 365/230.04

(56) References Cited

U.S. PATENT DOCUMENTS

| | | | |
|---|---|---|---|
| 5,276,642 A | * | 1/1994 | Lee ......................... 365/189.04 |
| 5,283,877 A | | 2/1994 | Gastinel et al. ............. 711/105 |
| 5,590,086 A | * | 12/1996 | Park et al. .............. 365/230.03 |
| 5,649,148 A | * | 7/1997 | Gresham ................ 365/189.02 |
| 5,691,955 A | * | 11/1997 | Yamauchi ................... 365/233 |
| 5,708,850 A | | 1/1998 | Staros ......................... 710/48 |
| 5,710,733 A | | 1/1998 | Chengson et al. ............. 365/52 |
| 5,799,209 A | * | 8/1998 | Chatter ......................... 710/56 |
| 5,890,013 A | * | 3/1999 | Nair et al. ..................... 710/53 |
| 5,890,195 A | * | 3/1999 | Rao ........................... 711/105 |
| 6,183,367 B1 | * | 2/2001 | Kaji et al. .................. 345/418 |

* cited by examiner

Primary Examiner—Matthew Kim
Assistant Examiner—Matthew D. Anderson
(74) Attorney, Agent, or Firm—William N. Hogg

(57) ABSTRACT

An improved memory card and its use in a computer system is provided. The computer system has a system bus which provides requests from a CPU to a memory controller, which then provides signals to the memory card or module or a memory bus. The memory card is provided with first and second banks of DRAMs, a memory card bus and a DSP. Logic circuitry including a memory card data bus controller provides communication of the DSP with the banks of DRAM chips. Logic circuitry is also provided which can selectively connect the DSP to either the first or second bank of DRAMs and selectively connect the memory bus with the other bank of DRAMs or with both banks of DRAMs. Hence when the CPU is accessing one bank of DRAMS the DSP can access the other bank of DRAMs thus allowing the DSP to function utilizing the bank of DRAMs not being accessed by the memory bus to service the CPU or some I/O device.

21 Claims, 1 Drawing Sheet

METHOD AND APPARATUS FOR ADDRESSING INDIVIDUAL BANKS OF DRAMS ON A MEMORY CARD

BACKGROUND OF THE INVENTION

1. Field of the Invention

This invention relates generally to memory modules such as SIMMs and DIMMs utilizing signal processing elements, and more particularly to a more efficient technique for using signal processing elements in conjunction with memory busses in addressing memory chips on memory cards.

2. Background Information

The use of signal processing elements, such as digital signal processors (DSPs) on memory cards such as SIMMs or DIMMs is being done in order to use a relatively inexpensive processor for certain tasks on the memory card as well as to process information from the DRAMs on the memory cards while the memory bus is performing other tasks. For example a DSP can be used to perform speech recognition tasks, or translation tasks, or modem functions, all of which take a significant amount of time, and can tie up the system CPU if it is used for performing such tasks. Thus, the use of DSP's frees the system CPU to perform other tasks while the DSP on the memory card is performing its assigned tasks involving the memory chips.

According to prior art proposals for DSPs either the memory bus (tied to the memory controller) or the memory card data bus (tied to the DSP on the memory card) has access to the memory chips, but not both. Thus while the system bus is accessing the DRAMs the DSP cannot perform its tasks. It is thus desirable that a technique be provided that will increase the time that a signal processing element can access the memory chips without interfering with the access of the memory bus.

SUMMARY OF THE INVENTION

According to the present invention an improved memory card and its use in a computer system is provided. The computer system has a system bus which provides requests from a CPU to a memory controller, which then provides signals to the memory card or module on a memory bus. The memory card is provided with first and second banks of DRAMs or other memory chips, a memory card bus and a signal processing element. Logic circuitry including a memory card data bus controller provides communication of the signal processing element with the banks of DRAM chips. Logic circuitry is also provided which can selectively connect or disconnect the signal processing element to either the first or second bank of DRAMs and selectively connect the memory bus with the other bank or both banks of DRAMs. Hence when the CPU is accessing one bank of DRAMS the DSP can access the other bank of DRAMs thus allowing the signal processor to function utilizing the bank of DRAMs not being accessed by the memory bus as a result of the CPU or some I/O device.

DESCRIPTION OF THE DRAWING

The single FIGURE is a block diagram of a memory module used in a computer according to the present invention.

DESCRIPTION OF THE PREFERRED EMBODIMENT(S)

Figure 1:
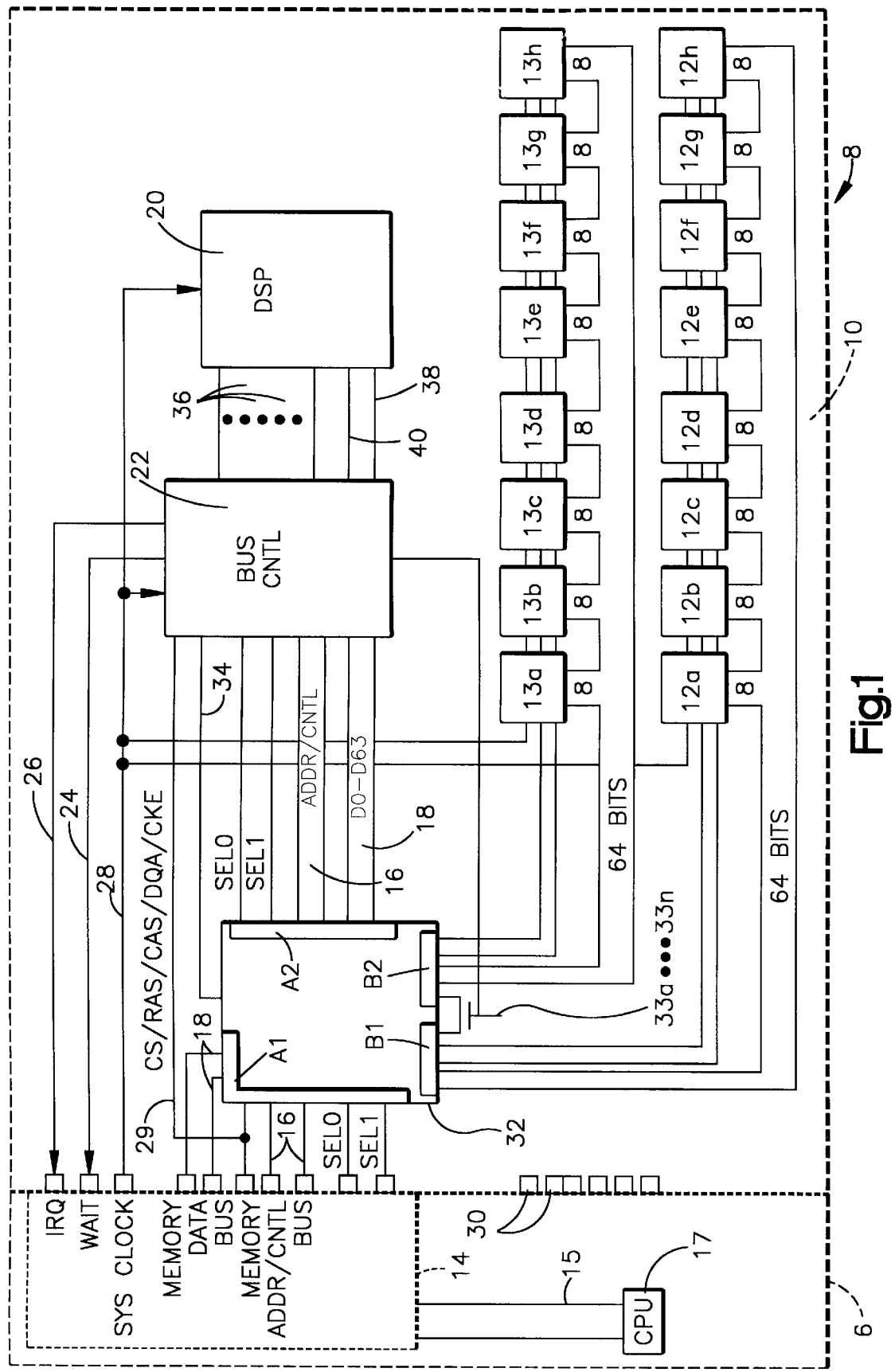

Referring now to the drawing, the single FIGURE depicts a memory card installed in a computer which allows a signal processing element to access either one of two banks of memory chips on the memory card so that the signal processing element can operate on one bank of memory chips at the same time the system memory bus is accessing another bank of memory chips on the same card.

A personal computer 6 including a CPU 7 is provided which has installed therein a memory module or card 8. The module 8 includes a printed circuit card 10 having logic circuitry formed thereon, some of which will be described presently. Two separately addressable banks of synchronous DRAMs (SDRAMs) 12a–12h and 13a–13h are mounted on the printed circuit card 10. Any number of SDRAMs may be present in each bank, but one usual number is eight SDRAMs in each bank and that is what is depicted; however other numbers of SDRAMs could be employed in each bank. All that is required is that there be at least two separately addressable banks of DRAMs.

A system memory controller 14 is provided which is connected to the CPU by system bus 15 and which supplies the necessary control signals and address signals on address/control bus 16a and data on a memory data bus 18a (which is as wide as the width of the data). A Select 0 (SEL0) line for actuating memory bank 12a–12h and Select (SEL1) line for actuating memory bank 13a–13h are shown separately from the control bus 16a since each of these signals must be separately routed to either memory bank 12a–12h or memory bank 13a–13h depending upon which bank the memory controller wishes to access. It is the signals on these lines and busses that provide the read/write function to the SDRAMs on the module 8 from the system memory controller 14. If asynchronous DRAMs are used, RAS0 and RAS1 signals are used to address the banks 12a–12H and 13a–13h respectively.

The card 10 also has on board a signal processing element 20 which in the preferred embodiment is a digital signal processor (DSP). A particularly useful DSP is any one of the TMS 320C54X family manufactured by Texas Instruments, Inc. The DSP 20 is a relatively low cost microprocessor which can perform various tasks using the data stored in the SDRAMs, and is connected to a memory card bus controller 22 with the address control bus 16a, data bus 18a (which combine a memory bus) as well as SEL0 and SEL1 lines. Additionally there is wait line 24, an interrupt request line (IRQ) 26 and a system clock line 28 to the memory card bus controller 22 from the system memory controller 14. A control bypass bus 29 is also provided between the address control bus 16a and the bus controller 22. (The DSP 20 may be clocked at a different frequency, by use of an on-card oscillator or an internal clocking signal). All of the busses and lines from the system memory controller are connected to the card 10 through contacts 30 as is well know in the art.

The card 10 is also provided with a cross bar switch 32. The purpose of the cross bar switch 32 is to selectively connect the DSP 20 to either the bank of DRAMs 12a–12h or 13a–13h, through the memory card bus controller 22 and at the same time connect the system memory controller 14 to the other of the DRAM banks 12a–12h or 13a–13h as will be explained presently. A particularly useful cross bar switch is Texas Instruments SN74CBJ16212 24 bit Bus Exchange Switch. The cross bar control switch includes ports A1, A2, B1, and B2. The switching function is A1⇌B1 and A2⇌B2 or A1⇌B2 and A2⇌B1. The information on port B1 controls DRAMs 12a–12h and that information on port B2 controls DRAMs 13a–13h. A cross bar control signal line 34 extends from the memory bus controller 22 to the cross bar switch 32. Also a DSP address bus 36, a DSP data bus 38 and a DSP control bus 40 communicate between the DSP 20 and the memory bus controller 22.

The operation of the memory module 8 in the computer 6 is as follows:

In quiescent mode, the DSP is idle and the system has access to both banks of memory by having the memory-controller-connected A1 port of the cross-bar switch 32 connected to the B1 port, which in turn is connected to DRAMs 12a–12h. Connectivity to SDRAMs 13a–13h is provided by an additional FET bus switches 33a–33n which connect every signal connected to SDRAMs 12a–12h to its corresponding signal going to SDRAMs 13a13h when the switches 33a–33n are closed by bus controller 22. For example, data bit line 0 of port B1 is connected to data bit line 0 of port B2 through bus switch 33a. Data bit line 1 of port B1 is connected to data bit line 1 of port B2 through bus switch 33b, and so on. All signals are likewise connected so that during quiescent mode, port B1 and port B2 are electrically a single port addressing both banks of SDRAMs, which is exactly how a conventional SDRAM memory card appears to the system and memory controller 14. A suitable part for such a bus switch function is the TI SN74CBT16211 24-bit bus switch component. It should be noted that the function of crossbar switch 32 and bus switches 33a–33n could be combined into a single, monolithic function, however, such a part is not currently available commercially, and the discrete implementation is thus preferred due to commercial parts availability.

When any bank of memory on the memory card is required by the DSP, and upon completion of any access currently in progress by the memory controller the switches 33a–33n are opened by bus controller 22. Then the cross bar switch 32 will be in a position of connecting the memory bus controller 22 to one of the two banks of DRAMs 12a–12h or 13a–13h, and the system memory controller 14 to the other of the banks. As long as there is no access attempt from the computer 6 through the system memory controller 14 the DSP can work on the data in either of the banks of DRAMs by virtue of the cross bar switch 32 under the control of the cross bar control signal on the line 34. This is done by switching the DSP back and forth between the two banks of DRAM as required. The memory card is in quiescent mode whenever the DSP is not active.

It will be remembered that the system memory controller 32 always has access either to both DRAM banks (if the DSP is not accessing memory) or one of the two banks of DRAMs 12a–12h or 13a–13h, DSP 20 always has access to the other bank. In the latter case, the memory controller 14 thus can access one or both of the banks of the DRAMs, to perform read/write operations as required. In those instances where bus switches 33a–33n are active, the DSP 20 can access the other bank of DRAMs to perform read/write operations and its required functions.

However, as long as the DSP is not performing any function, the memory controller 14 can access either of the two banks 12a–12h and 13a–13h of the DRAMs because the memory card is in quiescent mode (i.e. no internally generated accesses).

However, if the memory controller 14 needs access to the other bank of DRAMs than the one to which it has access and the DSP 20 is performing a read or write operation to the other bank, a wait signal will be impressed on the wait line 24 upon receipt of the access attempt, and the memory controller 14, in a well known way will wait a predetermined amount of time until the wait signal is removed at which time the crossbar switch 32 will grant access to the other bank. On the other hand, if the DSP needs access to the bank of DRAMs other that the one to which it has access at any given time, it will determine from the address control bypass bus 29 if this other bank is free (i.e. not being used by the memory controller 32 for a read/write operation or other operation). If the other bank is not being accessed, the crossbar switch 32 will switch the access of the DSP to the other bank. If however, the control bypass 29 indicates to the DSP that the other bank of DRAMs is occupied by the controller 14 for a read/write operation, the DSP through the bus controller 32 will wait until this requested bank of DRAMs is free. If this is low priority interrupt the controller 14 waits a predetermined or preselected amount of time such as if the DSP 20 is performing or required to perform background functions, such as scrubbing memory. If however, the DSP 20 needs immediate servicing, such as if it is performing a modem required function, the bus controller 22 will issue an interrupt signal on the IRQ line 26. In such a case, the memory controller 14 will finish the task in which it is engaged and allow access to this bank of memories to the DSP 20 through the bus controller 22. Thus, the memory controller can access either bank of DRAMs 12a–12h or 13a–13h as long as the DSP 20 is idle, and the DSP can access either bank of DRAMs 12a–12h or 13a–13h which is not being presently accessed by the memory controller 14. Hence, both the memory controller 14 and the DSP 20 each have access to opposite banks of the DRAMs 12a–12h and 13a–13h at the same time to perform further respective functions. This is a very convenient technique of handling the functions of both the DSP and the main memory controller 14 since these two do not generally need access to both memory banks at the same time.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A memory card for use in a computer having a CPU and a memory controller, which computer has a memory bus to provide communication of the memory controller with the memory card, said memory card comprising, first and second banks of DRAMs mounted on said memory card and circuitry to access each bank individually, a memory card bus on said card, a signal processor, logic circuitry including a memory card bus controller and switching circuitry to selectively provide communication of said signal processor with either said first or said second bank of DRAMs and concurrent communication of said memory bus with the other of said first or second bank of DRAMs.

2. The invention as defined in claim 1 wherein said DRAMs are synchronous DRAMs.

3. The invention as defined in claim 1 further including an interrupt request line and a wait line between said memory bus and said memory bus controller.

4. The invention as defined in claim 1 wherein the signal processing element is a digital signal processor.

5. The invention as defined in claim 1 wherein said logic circuitry includes a cross bar switch.

6. The invention as defined in claim 1 wherein said memory card has a clock line for connection to a system clock.

7. The invention as defined in claim 1 wherein said logic circuitry includes circuitry to enable access to both banks of DRAMs by the memory controller when said signal processor is not communicating with either bank of DRAMs.

8. In combination, a computer system having a memory controller and a memory card attached thereto through a memory bus comprising, said memory card having first and second banks of DRAMs mounted thereon and circuitry to access each bank individually, a memory card bus on said card, a signal processor, logic circuitry including a memory card bus controller and switching circuitry to selectively provide communication of said signal processor with either said first or said second bank of DRAMs and concurrent communication of said memory bus with the other of said first or second bank of DRAMs, and connector on said memory card connected to said memory bus and said memory card bus controller.

9. The invention as defined in claim 8 wherein said DRAMs are synchronous DRAMs.

10. The invention as defined in claim 8 further including an interrupt request line and a wait line between said memory bus and said memory bus controller.

11. The invention as defined in claim 8 wherein the signal processing element is a digital signal processor.

12. The invention as defined in claim 8 wherein said logic circuitry includes a cross bar switch.

13. The invention as defined in claim 8 wherein said memory card has a clock line for connection to a system clock.

14. The invention as defined in claim 8 wherein said logic circuitry includes circuitry to enable access to both banks of DRAMs by the memory controller when said signal processor is not communicating with either bank of DRAMs.

15. A method of selectively connecting a memory controller of a computer system through a memory bus with either one of two banks of DRAMs on a memory card and a signal processing element on said card with the other of said two banks, comprising the steps of:

providing first and second banks of DRAMs mounted on said memory card and circuitry to access each bank individually, providing a memory card bus on said card, providing logic circuitry including a memory card bus controller and switching circuitry to selectively provide communication of said signal processor with either said first or said second bank of DRAMs and concurrent communication of said memory bus with the other of said first or second bank of DRAMs, and selectively switching said memory controller between one of said two banks of DRAM's and the signal responsive to a signal from the signal processor to said memory card bus controller.

16. The invention as defined in claim 15 wherein said DRAMs are synchronous DRAMs.

17. The invention as defined in claim 15 further including an interrupt request line and a wait line between said memory bus and said memory bus controller.

18. The invention as defined in claim 15 wherein the signal processing element is a digital signal processor.

19. The invention as defined in claim 15 wherein said logic circuitry includes a cross bar switch.

20. The invention as defined in claim 15 wherein said memory card has a clock line for connection to a system clock.

21. The invention as defined in claim 15 further characterized by connecting said memory controller to both banks of DRAMs when said signal processor is not communicating with either bank of DRAMs.

* * * * *